US005936545A

United States Patent [19]

Tsumura

[11] Patent Number: 5,936,545

[45] Date of Patent: Aug. 10, 1999

[54] RADIO-PAGING RECEIVER HAVING A FLEXIBLE MESSAGE DISPLAY FUNCTION

[75] Inventor: Toshiyuki Tsumura, Yokohama, Japan

[73] Assignee: Matsushita Electric Industrial Co., Ltd., Osaka, Japan

[21] Appl. No.: 08/783,145

[22] Filed: Jan. 14, 1997

[30] Foreign Application Priority Data

May 28, 1996 [JP] Japan .................................... 8-133505

[51] Int. Cl.[6] ........................................................ H04Q 7/18

[52] U.S. Cl. .................................. 340/825.44; 340/311.1; 455/517; 345/472; 345/468; 370/313

[58] Field of Search ............................ 340/825.44, 311.1, 340/825.69; 455/38.4, 140, 526, 517, 575; 345/471, 472, 468, 467; 370/313, 314; 1/1

[56] References Cited

U.S. PATENT DOCUMENTS 5,107,259 4/1992 Weitzen et al. .................... 340/825.44
5,297,247 3/1994 Kan ........................................ 455/38.4
5,539,529 7/1996 Merchant ....................... 340/825.44 X

FOREIGN PATENT DOCUMENTS 6-77881 3/1994 Japan .

*Primary Examiner*—Michael Horabik
*Assistant Examiner*—William H. Wilson, Jr.
*Attorney, Agent, or Firm*—Lowe Hauptman Gopstein Gilman & Berner

[57] ABSTRACT

A display control section displays characters on a display screen of a display section. Character information data, including a plurality of character sizes, a plurality of character intervals, and a plurality of line spacings, are stored in a character data ROM or an EEPROM section. A control section determines an optimum display pattern in accordance with the length of a received message involved in a paging signal by adequately selecting the character information stored in the character information memory. There is an external input section for allowing a user to determine the display pattern in accordance with user's preference.

9 Claims, 3 Drawing Sheets

RADIO-PAGING RECEIVER HAVING A FLEXIBLE MESSAGE DISPLAY FUNCTION

BACKGROUND OF THE INVENTION

1. Field of the Invention

The present invention relates to a radio-paging receiver for personal use, which has a function of transmitting and receiving a message consisting of a plurality of characters as well as a function of displaying the message on a display screen.

2. Prior Art

Japanese Patent Application No. 6-77881, published in 1994, discloses a radio-paging receiver capable of changing a way of displaying message characters. According to this conventional radio-paging receiver, a message is read out from a character generator, and the total number of characters thus read out is detected by counting pulses generated upon every input of characters. Based on the total number of characters, the size of each character to be displayed is switched between 2N·2M dots and N·M dots, where N and M are integers.

Recent development in the field of the radio-paging system has significantly reduced the size and weight of each radio-paging receiver to improve the handiness. However, reducing the overall size of the radio-paging receiver will conflict with improvement of visibility of characters on the display screen.

More specifically, in accordance with an earnest desire to enlarge the length of a message transmissible or receivable, there is a tendency that the display screen is increased in its capacity or size to display at a time as many message characters as possible. To satisfy such a request, it is mandatorily necessary to provide a large display screen. This is why the recent development of the radio-paging receiver has been encountering with the above-described two conflicting subjects (i.e. the improvement of the handiness and the improvement of visibility).

According to the above-described conventional radio-paging receiver, the character size is forcibly reduced to a smaller one whenever the length of the message exceeds a predetermined value. In other words, for the purpose of increasing the number of characters to be displayed at a time on the display screen, the above-described conventional radio-paging receiver victimizes the visibility of displayed characters. For example, when the number of displayed characters is increased, the size of each character needs to be reduced. On the other hand, if the size of each character is increased, the number of characters displayable on the screen at a time will be reduced.

SUMMARY OF THE INVENTION

Accordingly, in view of above-described problems encountered in the prior art, a principal object of the present invention is to provide a novel and excellent radio-paging receiver capable of optimizing the display pattern in accordance with the length of each received message by adequately determining character information, such as numerical data relating to character sizes, character intervals, and line spacings.

In order to accomplish this and other related objects, the present invention provides a radio-paging receiver comprising a display section having a display screen, a character information memory storing character information, a display control section displaying characters on the display screen of the display section in accordance with a designated dot pattern, and control means reading out character data corresponding to a message involved in a paging signal from the character information memory and writing the readout character data to the display control section, thereby displaying the message on the display screen of the display section.

More specifically, the character information memory stores character information selected from the group consisting of a plurality of character sizes, a plurality of character intervals, and a plurality of line spacings. And, the control means determines an optimum dot pattern suitable for the message involved in the paging signal by adequately selecting the character information stored in the character information memory, thereby realizing an optimum display pattern satisfying both of two essential requirements (i.e. handiness and visibility) in the radio-paging receiver.

According to a preferred embodiment of the present invention, it is preferable that the character information memory stores a plurality of numerical data relating to character sizes. The control means counts a total number of the message characters involved in the paging signal and selects a suitable character size in accordance with the total number of the message. With this arrangement, when the length of the received message is small, the character size is increased to improve the visibility of each character displayed. On the other hand, when the length of the received message is large, the character size is reduced to display as many characters as possible.

Furthermore, it is preferable that the character information memory stores a plurality of numerical data relating to character intervals. And, the control means selects a suitable character interval in accordance with the total number of the message characters. With this arrangement, when the length of the received message is small, the interval of characters is increased to improve the visibility of the message displayed. In this case, it is further preferable to increase the character size as well. On the other hand, when the length of the received message is large, the character interval is reduced to display as many characters as possible.

Still further, it is preferable that the character information memory stores a plurality of numerical data relating to line spacings. And, the control means selects a suitable line spacing in accordance with the total number of the message characters. With this arrangement, when the length of the received message is small, the line spacing is increased to improve the visibility of the message displayed. In this case, it is further preferable to increase the character size and/or the character interval as well. On the other hand, when the length of the received message is large, the line spacing is reduced to display as many characters as possible.

Moreover, it is preferable that there is external input means for allowing a user to determine the display pattern in accordance with his/her preference.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
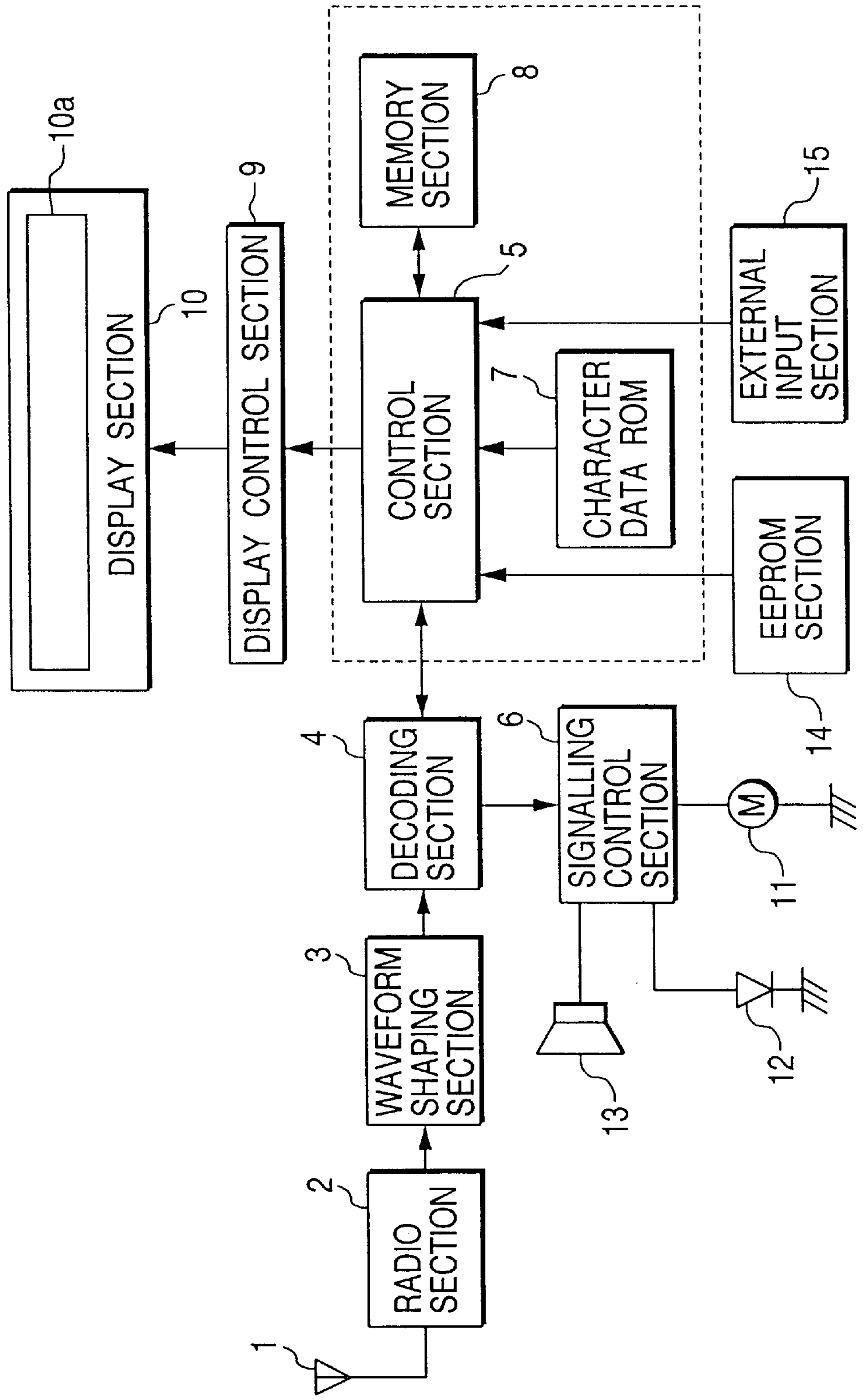
FIG. 1 is a schematic block diagram showing a radio-paging receiver in accordance with a preferred embodiment of the present invention.

A preferred embodiment of the present invention will be explained in greater detail hereinafter with reference to the accompanying drawings. Identical parts are denoted by the same reference numerals throughout the views.

FIG. 1 is a schematic block diagram showing an arrangement of a radio-paging receiver in accordance with a preferred embodiment of the present invention. The radio-paging receiver of the preferred embodiment comprises an antenna 1, a radio section 2, a waveform shaping section 3 which processes a received radio signal, a decoding section 4, a control section 5 which controls various sections, a signalling control section 6 which controls several signalling devices to notify a user of operations (e.g. start-up of the operation), a character data ROM 7 which serves as a character information storage memory, a memory section 8 having a structure described later, a display control section 9, a display section 10 which is controlled by the display control section 9, a motor 11 which activates the signalling devices such as an LED 12 and a speaker 13, an EEPROM section 14 which serves as other character information storage memory, and an external input section 15 which is manipulated by the user to input data.

In FIG. 1, a radio signal received by the antenna 1 is amplified and demodulated in the radio section 2. Then, the waveform shaping section 3 converts the amplified and demodulated signal into a digital signal processible in the decoding section 4. The decoding section 4 checks whether the received signal comprises a call address designating the own radio-paging receiver. When the call address is included, the decoding section 4 sends a start-up signal to the control section 5. The control signal 5 fetches message data following the call address and stores them in the memory section 8.

Figure 2:
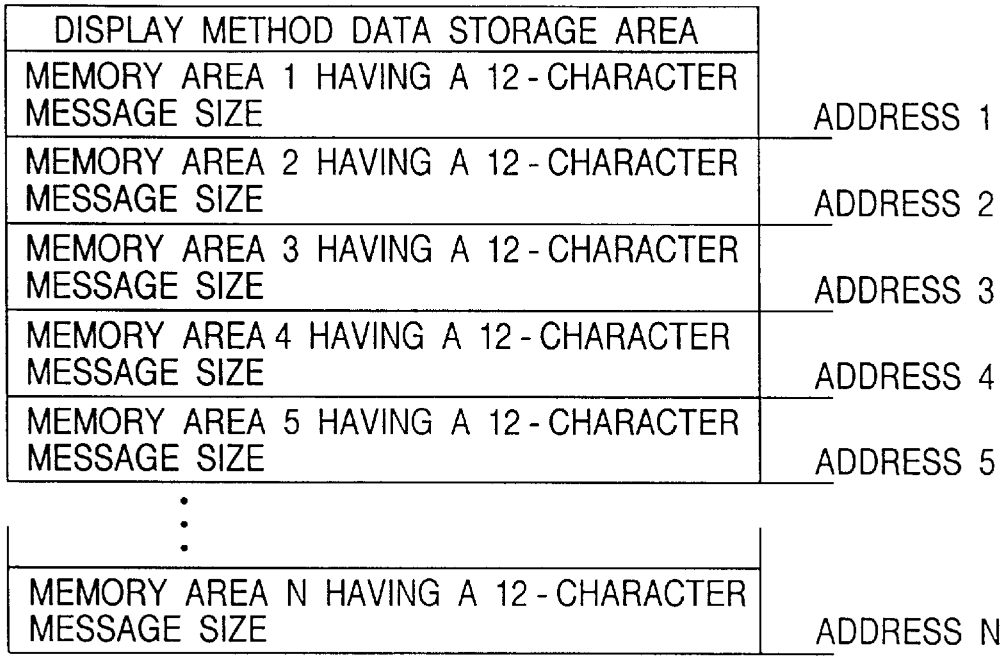
FIG. 2 is a view showing a data structure in a memory of the radio-paging receiver shown in FIG. 1.

FIG. 2 is a view schematically showing a data structure in the memory section 8. The control section 5, after finishing the storage of the message, develops the message in a predetermined message area of the memory section 8 for counting the total number of message characters. More specifically, the message area of the memory section 8 consists of a plurality of memory areas 1 through N each having a size capable of storing 12 characters by the smallest character size.

The control section 5 roughly judges the length of the message by comparing the present address on memory section 8 with each of addresses 1 through N of the memory areas 1 through N. Thus, when the development of a final character of the received message is finished, the zone to which the total number of the message characters belongs can be known from a comparison between the final address corresponding to the final character of the message with each of addresses 1 through N.

The control section 5 reads out preferable font data, character interval data, and line spacing data from the character data ROM 7 and the EEPROM section 14 in accordance with the total number of message characters detected in the above judgement. Then, after the display pattern is determined optimally with reference to these selected font data, character interval data and line spacing data, the character data are developed in the memory section 8. Then, the control section 5 transfers the developed character data to the display control section 9, and generates a command to start the display. Based on this start-up command, the display section 10 displays a message by an optimum display pattern or layout thus determined, details of which will be explained later in greater detail.

The control section 5 sends a signalling start-up command to the decoding section 4 upon generating the display start-up command to the display control section 9. The decoding section 4, in response to the signalling start-up command, generates an activation signal to the signalling control section 6 to operate the motor 11, LED 12 and speaker 13, thereby notifying a user of reception of the message designating the own address.

When the stored message is read out by a manual switching operation, the message is displayed in accordance with the above-described procedure. In this case, the control section 5 does not send the signalling start-up command to the signalling control section 6. Thus, these motor 11, LED 12 and speaker 13 are not activated.

Hereinafter, display examples in accordance with the above-described radio-paging receiver will be explained. The maximum display capacity of the display section 10 in this embodiment is 72 dots by 32 dots.

First of all, the size control of display characters will be explained. When the total number of the message characters is larger than 30, message characters having a size of 6×8 dots are arranged in a pattern (or layout) of four lines each consisting of 12 characters. When the total number of the message characters is in a range from 13 to 30, message characters having a size of 7×10 dots are arranged in a pattern (or layout) of three lines each consisting of 10 characters. Furthermore, when the total number of the message characters is not larger than 12, message characters having a size of 12×12 dots are arranged in a pattern (or layout) of 2 lines each consisting of 6 characters.

Figure 3A:
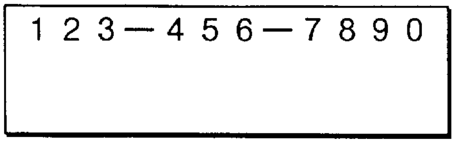
FIG. 3A PRIOR ART
FIGS. 3A through 3D are views illustrating differences of display patterns between a conventional display pattern and the present invention, as an effect of character size change in accordance with the operation of the radio-paging receiver shown in FIG. 1.
Figure 3B:
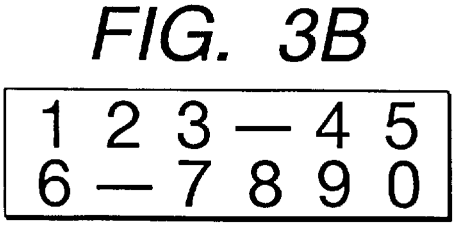
Figure 3C:
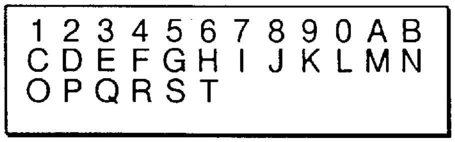
FIG. 3C PRIOR ART
Figure 3D:
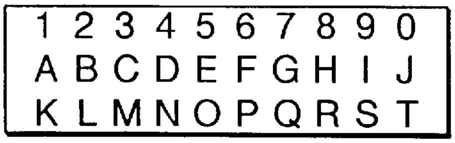

FIGS. 3A and 3B comparatively show the difference of display patterns in a case where a 12-character message is received. FIGS. 3C and 3D comparatively show the difference of display patterns in a case where a 30-character message is received. FIGS. 3A and 3C show the characters displayed on a screen according to the conventional display method, while FIGS. 3B and 3D show the characters displayed on the screen 10*a* of display section 10 according to the present invention. As apparent from FIGS. 3A and 3C, according to the conventional display method, the bottom of the display screen is not used effectively. On the contrary, the present invention utilizes the entire space of display screen 10a effectively for displaying the message as large as possible.

In short, the present invention makes it possible to arrange all of the message characters uniformly at the largest size and effectively utilize the entire space of the display screen 10*a* of the display section 10.

Next, the interval control of display characters will be explained. When the total number of the message characters is not smaller than 25, message characters having a size of 6×8 dots are arranged with an interval of 1 dot. When the total number of the message characters is smaller than 25, message characters having a size of 6×8 dots are arranged with an interval of 9 dots.

Figure 4A:
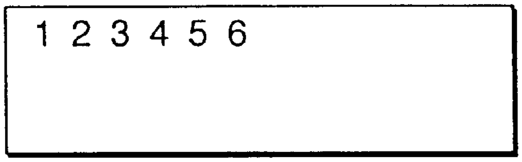
FIG. 4A PRIOR ART
FIGS. 4A and 4B are views illustrating difference of display patterns between the convention display pattern and the present invention, as an effect of character interval change in accordance with the operation of the radio-paging receiver shown in FIG. 1.
Figure 4B:
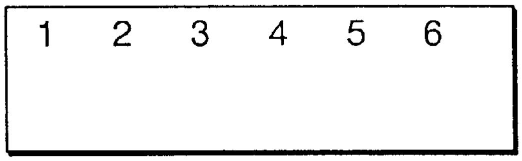

FIGS. 4A and 4B comparatively show the difference of display patterns in a case where a 6-character message is received. FIG. 4A shows the display pattern according to the conventional display method, while FIG. 4B shows the display pattern according to the present invention. As apparent from FIG. 4A, according to the conventional display method, the right region of the display screen is not used effectively. On the contrary, the present invention utilizes the entire space of display screen 10*a* effectively in the lateral direction to display the message as wide as possible.

In short, the present invention makes it possible to arrange all of the message characters uniformly at the largest character interval and effectively utilize the entire space of display screen 10*a* of the display section 10.

In this case, it is more effective to cooperatively change the character size and character interval. For example, when the length of the received message is small, the character size and the character interval are both enlarged to improve the visibility of the message displayed.

Next, the line spacing control of the display characters will be explained. When the total number of the message characters is larger than 36, message characters are arranged in a pattern (or layout) of four lines each consisting of 12 characters. When the total number of the message characters is not larger than 36, message characters are arranged in a pattern (or layout) of three lines each consisting of 12 characters.

Figure 5A:
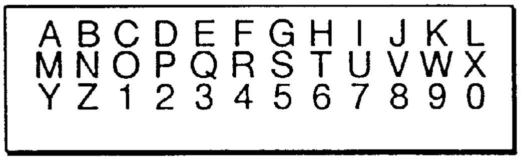
FIG. 5A PRIOR ART
FIGS. 5A and 5B are views illustrating difference of display patterns between the convention display pattern and the present invention, as an effect of line spacing change in accordance with the operation of the radio-paging receiver shown in FIG. 1.
Figure 5B:
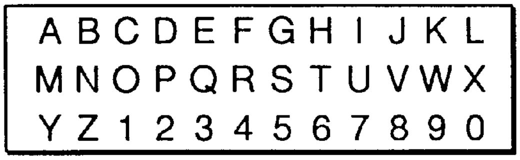

FIGS. 5A and 5B comparatively show the difference of display patterns in a case where a 36-character message is received. FIG. 5A shows the display pattern according to the conventional display method, while FIG. 5B shows the display pattern according to the present invention. As apparent from FIG. 5A, according to the conventional display method, the bottom of the display screen is not used effectively. On the contrary, the present invention utilizes the entire space of display screen 10*a* effectively in the vertical direction.

In short, the present invention makes it possible to arrange all of the message characters uniformly at the largest line spacing and effectively utilize the entire display screen 10*a* of the display section 10.

In this case, it is more effective to cooperatively change the character size, the character interval, and the line spacing. For example, when the length of the received message is small, the character size, the character interval, and the line spacing are all enlarged to improve the visibility of the message displayed.

The above-described controls of the character size, character interval, and line spacing are performed automatically by the control unit 5. However, the preferred embodiment of the present invention comprises the external input section 15 which allows each user to input display data arbitrarily. Thus, it is possible to change the display pattern in accordance with the preference of each user. Thus, each user can change the character size, the character interval, and the line spacing flexibly by manipulating the external input section 15.

As explained above, the radio-paging receiver of the present invention has character data ROM 7 and EEPROM section 14 storing numerical data relating to character sizes, character intervals, and line spacings. Thus, it becomes possible to flexibly change the character font in accordance with the length of the message received.

Needless to say, the data volumes or kinds of the character sizes, character intervals, and line spacings can be increased with increasing capacity of character data ROM 7 and EEPROM section 14. When the character information are stored in the EEPROM section 14, the content can be easily rewritten by using a ROM writer or the like in accordance with various requests of individual users.

The method of detecting the length of a received message is not limited to the above-described method of comparing the addresses, and can be replaced by other effective methods.

As explained in the foregoing description, the present invention makes it possible to change the display character size, the display character interval, and the line spacing in accordance with the total number of the characters involved in the message received. With this flexibly change of the display pattern, the display screen of the display section can be fully and entirely used in both of lateral and vertical directions.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A radio-paging receiver comprising:

a display section having a display screen;

a character information memory for storing character information;

a display control section for displaying characters on said display screen of said display section in accordance with a designated dot pattern;

control means for reading out character data representing a message involved in a paging signal from said character information memory, and writing the readout character data to said display control section to display the message on said display screen of said display section, wherein said character information memory stores at least one kind of character information selected from the group consisting of a plurality of character sizes, a plurality of character intervals, and a plurality of line spacings, and said control means counts a total number of characters constituting said message involved in said paging signal and determines an optimum dot pattern suitable for said message involved in said paging signal by adequately selecting the character information stored in said character information memory in accordance with the total number of said characters constituting said message, thereby displaying said message on said display screen of said display section.

2. The radio-paging receiver in accordance with claim 1, wherein said character information memory stores a plurality of data relating to character sizes, while said control means selects a suitable character size in accordance with the total number of the characters of said message.

3. The radio-paging receiver in accordance with claim 1, wherein said character information memory stores a plurality of data relating to character intervals, while said control means selects a suitable character interval in accordance with the total number of the characters of said message.

4. The radio-paging receiver in accordance with claim 1, wherein said character information memory stores a plurality of data relating to line spacings, while said control means selects a suitable line spacing in accordance with the total number of the characters of said message.

5. The radio-paging receiver in accordance with claim 1, further comprising external input means for allowing a user to determine said dot pattern in accordance with user's preference.

6. A radio-paging receiver comprising:

a display section having a display screen;

a character information memory for storing character information;

a display control section for displaying characters on said display screen of said display section in accordance with a designated dot pattern;

control means for reading out character data representing a message involved in a paging signal from said character information memory, and writing the readout character data to said display control section to display the message on said display screen of said display section, wherein said character information memory stores at least two kinds of character information selected from the group consisting of a plurality of character sizes, a plurality of character intervals, and a plurality of line spacings, and said control means counts a total number of characters constituting said message involved in said paging signal and determines an optimum dot pattern suitable for said message involved in said paging signal by adequately determining data relating to at least two of character size, character interval, and line spacing in accordance with the total number of said characters constituting said message, thereby displaying said message on said display screen of said display section.

7. A radio-paging receiver comprising:

receiving means for receiving a paging signal;

decoding means for decoding a message involved in said paging signal;

a character information memory storing a plurality kinds of character information;

arranging means for counting a total number of characters constituting said message involved in said paging signal and determining an optimum display pattern of said message in accordance with the total number of said characters constituting said message by selecting an adequate combination of said plurality kinds of character information; and a display device for displaying said message.

8. The radio-paging receiver in accordance with claim 7, wherein said character information memory stores the character information selected from the group consisting of a plurality of character sizes, a plurality of character intervals, and a plurality of line spacings.

9. The radio-paging receiver in accordance with claim 7, wherein said arranging means determines said optimum display pattern so that characters of said message are arranged uniformly in an entire space of a display screen of said display device.

* * * * *